(12) United States Patent
Peters et al.

(10) Patent No.: US 10,716,200 B2
(45) Date of Patent: *Jul. 14, 2020

(54) PLASMA ARC CUTTING SYSTEM, INCLUDING RETAINING CAPS, AND OTHER CONSUMABLES, AND RELATED OPERATIONAL METHODS

(71) Applicant: Hypertherm, Inc., Hanover, NH (US)

(72) Inventors: John Peters, Canaan, NH (US); Brian J. Currier, Newport, NH (US)

(73) Assignee: Hypertherm, Inc., Hanover, NH (US)

( * ) Notice: Subject to any disclaimer, the term of this patent is extended or adjusted under 35 U.S.C. 154(b) by 306 days.

This patent is subject to a terminal disclaimer.

(21) Appl. No.: 15/828,968

(22) Filed: Dec. 1, 2017

(65) Prior Publication Data

US 2018/0084631 A1 Mar. 22, 2018

Related U.S. Application Data

(63) Continuation of application No. 15/484,196, filed on Apr. 11, 2017, now Pat. No. 10,492,286.

(Continued)

(51) Int. Cl.
*B23K 10/00* (2006.01)
*H05H 1/28* (2006.01)
(Continued)

(52) U.S. Cl.
CPC .............. *H05H 1/28* (2013.01); *B23K 10/00* (2013.01); *B23K 10/006* (2013.01); *B23K 37/003* (2013.01); *H05H 1/34* (2013.01); *H05H 1/3405* (2013.01); *H05H 1/38* (2013.01); *H05H 2001/3436* (2013.01); *H05H 2001/3468* (2013.01)

(58) Field of Classification Search
CPC .. H05H 1/34; H05H 1/38; H05H 1/36; H05H 1/28; H05H 2001/3436; H05H 2001/3468; H05H 1/3405; B23K 10/00; B23K 10/006
USPC ...................... 219/121.49, 121.5, 121.52, 75
See application file for complete search history.

(56) References Cited

U.S. PATENT DOCUMENTS

| 5,206,481 A | 4/1993 | Rossner et al. |
| 5,747,767 A * | 5/1998 | Severance ................ H05H 1/28 219/121.5 |

(Continued)

FOREIGN PATENT DOCUMENTS

| WO | 01/38035 A2 | 5/2001 |
| WO | 03/089183 A1 | 10/2003 |

*Primary Examiner* — Mark H Paschall
(74) *Attorney, Agent, or Firm* — Proskauer Rose LLP

(57) ABSTRACT

A liquid cooled shield assembly for a plasma arc torch includes an inner cap and a shield. The inner cap includes a substantially hollow body having a proximal end and a distal end that define a longitudinal axis, the distal end including an annular portion about the longitudinal axis. The inner cap also includes a liquid passage defined, at least in part, by an interior surface of the body, the liquid passage including a first set of ports in the annular portion, the first set of ports extending between an interior portion of the body and an exterior portion of the body to convey a liquid therethrough. The shield at least partially surrounds the inner cap and has a liquid impingement region on an interior surface of the shield adjacent to the first set of ports, the liquid impingement region for receiving the cooling liquid.

22 Claims, 3 Drawing Sheets

Related U.S. Application Data

(60) Provisional application No. 62/320,935, filed on Apr. 11, 2016.

(51) Int. Cl.
  *H05H 1/34* (2006.01)
  *B23K 37/00* (2006.01)
  *H05H 1/38* (2006.01)

(56) References Cited

U.S. PATENT DOCUMENTS

| | | |
|---|---|---|
| 6,498,316 B1 | 12/2002 | Aher et al. |
| 7,145,098 B2 | 12/2006 | MacKenzie et al. |
| 8,853,589 B2 | 10/2014 | Krink et al. |
| 2009/0230097 A1* | 9/2009 | Liebold .................... H05H 1/34 219/121.49 |
| 2013/0026141 A1* | 1/2013 | Liebold .................. B23K 9/296 219/121.49 |
| 2017/0042014 A1* | 2/2017 | Sanders ................ B23K 9/285 |

\* cited by examiner

PLASMA ARC CUTTING SYSTEM, INCLUDING RETAINING CAPS, AND OTHER CONSUMABLES, AND RELATED OPERATIONAL METHODS

RELATED APPLICATION

This application is a continuation of U.S. patent application Ser. No. 15/484,196, which was filed on Apr. 11, 2017 and entitled "Plasma Arc Cutting System, Including Retaining Caps, and Other Consumables, and Related Operational Methods." This application also claims the benefit of U.S. Provisional Patent Application No. 62/320,935, which was filed on Apr. 11, 2016 and entitled "Consumables for Plasma Arc Torch." The entire contents of these applications are incorporated herein by reference in their entireties.

FIELD OF THE INVENTION

The invention relates generally to the field of plasma arc cutting systems and processes. More specifically, the invention relates to improved consumable components (e.g., inner caps, nozzle caps or retaining caps) and operational methods for operating and cooling a plasma arc torch.

BACKGROUND

Plasma arc torches are widely used in the cutting and marking of materials. A plasma arc torch generally includes an electrode and a nozzle having a central exit orifice mounted within a torch body, electrical connections, passages for cooling, and passages for arc control fluids (e.g., plasma gas). The torch produces a plasma arc, i.e., a constricted ionized jet of a gas with high temperature and high momentum. Gases used in the torch can be non-reactive (e.g., argon or nitrogen) or reactive (e.g., oxygen or air). During operation, a pilot arc is first generated between the electrode (cathode) and the nozzle (anode). Generation of the pilot arc can be by means of a high frequency, high voltage signal coupled to a DC power supply and the torch or by means of any of a variety of starting methods.

In many prior art plasma arc torches, coolant travels along a circuitous path within the torch (e.g., forward to the nozzle, then back to the torch head, then forward to the shield, then back to the torch head), requiring a significant driving force to propel the coolant within the torch. An example of such a prior art torch is shown and described in U.S. Pat. No. 8,389,887, entitled "Apparatus and method for a liquid cooled shield for improved piercing performance." In this arrangement, coolant flows from a source through the plasma arc torch to a surface of the shield and back through the plasma arc torch, requiring multiple trips for the coolant to contact both the shield and the nozzle. Still some other prior art torches have substantial deadspots in the coolant flow and/or unidirectional coolant flow which does not provide even cooling to the nozzle, shield, and other consumables in the torch tip. What is needed is a configuration in which the coolant is routed directly to the consumables, such that a minimal driving force is required to move coolant through the plasma arc torch in a substantially uniform and symmetrical manner.

SUMMARY OF THE INVENTION

The present invention relates to improved consumables (e.g., inner caps, including nozzle caps and retaining caps) for plasma arc torches and associated methods of directing fluid flow and cooling consumables in plasma arc torches. An interleaved series of apertures or slots, some of which carry liquid coolant and some of which carry shield gas, is arranged in an inner cap to produce a cross-flow of liquid and gas within and/or through the inner cap. An axially oriented set of holes permits the shield gas to pass to the shield, and a radially oriented set of holes permits a liquid coolant to pass from the nozzle to the shield, both within an annular portion (or "neck") of the inner cap near the plenum.

The present invention enables coolant to be moved directly through the consumables via a direct coolant pathway, minimizing the required driving force needed to propel coolant through the torch. In addition, the invention uses space more efficiently in the annular portion of the inner cap, so that certain features can be removed from the torch itself. In some embodiments, this reorganization allows the "pointiness" of the torch to be increased, which can be beneficial for robotics applications and can make it easier for the torch to fit into tight spaces.

In addition, the present invention reorganizes the inlet and the outlet to be essentially radially symmetrical, with the consumables fed from 360 degrees. This stands in contrast to previous designs that fed from 180 degrees (i.e., there was an "in" flow side and an "out" flow side), in which the inlet and outlet needed to be oriented with respect to each other, and in which dead spots and uneven cooling in the torch tip were common. A key feature is to push some of the more complex torch features into the retaining cap, allowing the complex machining processes to be done less frequently. In addition, the shield cap is allowed to be manufactured as a single piece (rather than in two pieces), which results in a savings of cost and weight. In particular, the shield cap now needs to direct coolant only in one direction. In previous technologies, the shield cap included two pieces because the coolant traveled back into the torch after cooling the nozzle. The coolant then had to be directed forward to the shield and then rearward back to the power supply by the shield cap. Because the coolant had to go both to and from the shield, it required two pieces. The direct path from the nozzle to the shield enables the present invention to use a single piece shield cap.

In one aspect, the invention features an inner cap for a liquid-cooled plasma arc torch. The inner cap includes a substantially hollow body having a longitudinal axis, a first end, and a second end. The first end includes an annular portion configured to be disposed proximate a torch tip of the plasma arc torch. The inner cap also includes a liquid passage formed within the body and shaped to convey a liquid therethrough. The liquid passage has a first set of ports formed in the annular portion. The inner cap also has a gas passage formed within the body and shaped to convey a gas therethrough. The gas passage includes a second set of ports formed in the annular portion. The annular portion is configured such that subsets of ports in the first set of ports direct the liquid in a radial direction with respect to the longitudinal axis and alternate, in a rotational direction about the longitudinal axis, with subsets of ports in the second set of ports that direct the gas in a direction substantially parallel with the longitudinal axis.

In some embodiments, the first set of ports is interleaved with the second set of ports to create a cross-flow of liquid and gas in the annular portion during operation of the plasma torch. In some embodiments, each port in the first set of ports is perpendicular or substantially perpendicular to a corresponding port in the second set of ports. In some embodiments, the first set of ports is oriented perpendicular to the longitudinal axis and the second set of ports is oriented parallel to the longitudinal axis. In some embodiments, a plenum region is formed at least partially within the body. In some embodiments, a channel is formed in the body and configured to transport fluid between an interior surface of the plenum region and an exterior surface of a nozzle of the plasma arc torch during operation of the plasma arc torch. In some embodiments, the channel extends circumferentially about the plenum region.

In some embodiments, the inner cap is electrically insulative. In some embodiments, at least one of the first and second sets of ports includes slots in the body. In some embodiments, the gas passage is configured to transport a shield gas and the liquid passage is configured to transport a consumable coolant. In some embodiments, the inner cap includes a third set of ports aligned with the first set of ports to form a set of liquid passageways through the inner cap. In some embodiments, the first end includes a tapered portion adjacent to the annular portion. In some embodiments, the first end includes a neck portion.

In some embodiments, the gas passage includes a first set of pathways fluidly connected to an interior region of the inner cap and the liquid passage includes a second set of pathways fluidly connected to interior and exterior regions of the inner cap. In some embodiments, the inner cap includes an outer portion and an inner portion, the outer portion at least substantially enclosing the inner portion. In some embodiments, the inner cap includes a snap feature configured to secure the outer portion to the inner portion. In some embodiments, the outer portion is formed of plastic and the inner portion is formed of a metal or metal alloy, e.g., brass. Slots can be milled into the brass piece, which can help during assembly because when the plastic is pressed onto the brass piece, a stress riser is eliminated that could crack or cut the plastic. In some embodiments, the first set of holes in the inner cap includes between five and nine holes and the second set of holes in the inner cap includes between six and eighteen holes. In some embodiments, a ratio of flow area between the second set of holes and a set of metering holes in the first end of the inner cap is at least 2:1. In some embodiments, the inner cap is symmetrical in the rotational direction.

In another aspect, the invention features an inner cap for a liquid-cooled plasma arc torch. The inner cap includes an inner component having an interior surface and an exterior surface, the inner component defining a longitudinal axis of the inner cap. The inner cap also includes an outer component circumferentially disposed around the inner component, the outer component having an interior surface, an exterior surface, and an annular region. The annular region extends beyond the inner component along the longitudinal axis toward a torch end of the inner cap. The inner cap also includes a set of radial liquid passageways formed in the annular region of the outer component and oriented perpendicularly to the longitudinal direction. The set of liquid passageways is configured to pass a liquid coolant from a nozzle of the plasma arc torch to a shield of the plasma arc torch. The inner cap also includes a gas channel formed within the inner cap. The gas channel includes a first portion defined, at least in part, by a portion of the exterior surface of the inner component and a portion of the interior surface of the outer component. The gas channel also includes a second portion defined within the annular region of the outer component. The second portion includes a set of axial gas passageways configured to pass the gas to the shield of the plasma arc torch. In the annular region, subsets of passageways in the set of liquid passageways and the set of gas passageways alternate in a rotational direction about the longitudinal axis to create a cross-flow of liquid and gas during operation of the plasma arc torch.

BRIEF DESCRIPTION OF THE DRAWINGS

The foregoing discussion will be understood more readily from the following detailed description of the invention when taken in conjunction with the accompanying drawings.

DETAILED DESCRIPTION OF THE DRAWINGS

Figure 1A:
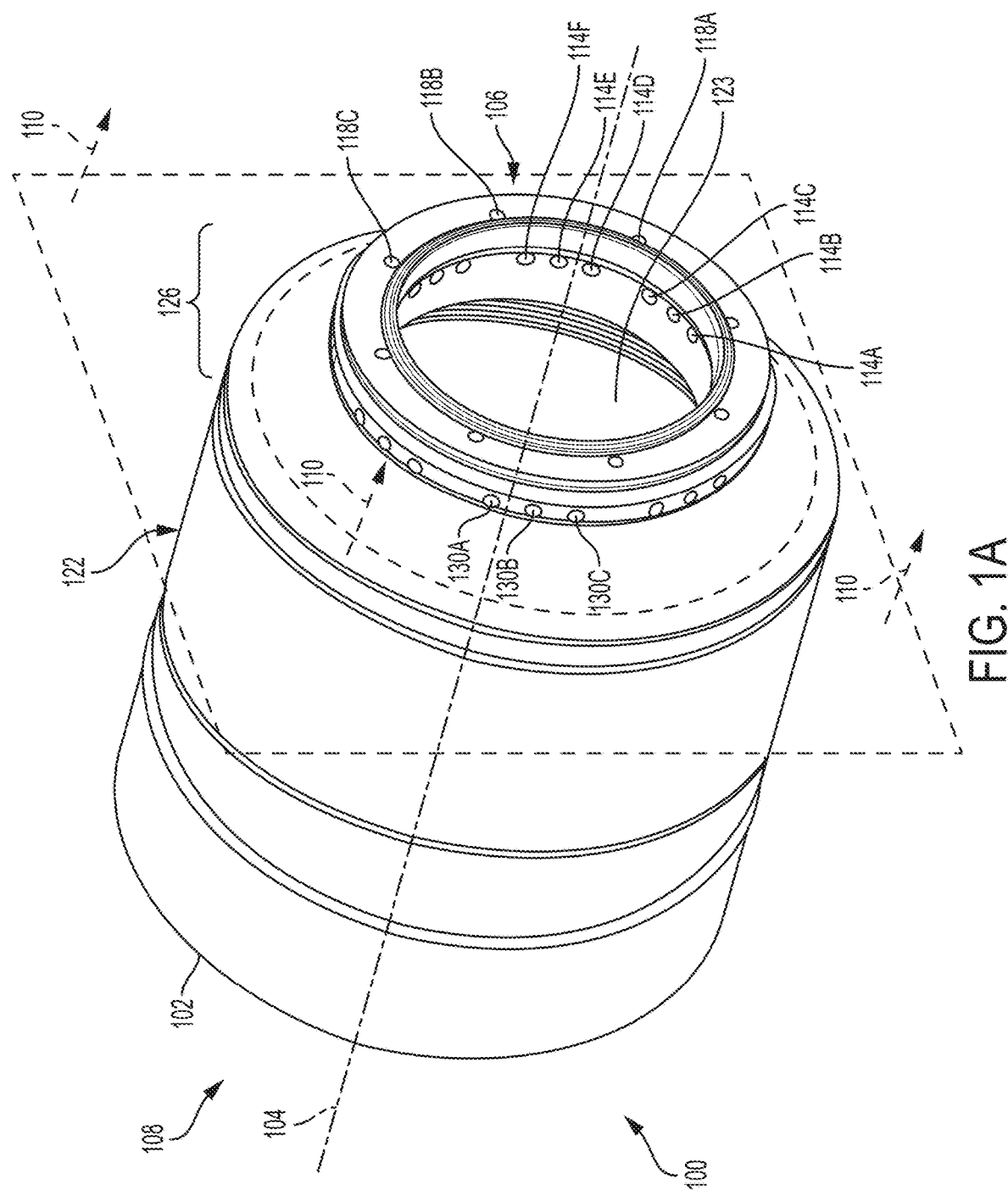
FIG. 1A is a perspective view of an inner cap for a liquid-cooled plasma arc torch, according to an illustrative embodiment of the invention.
Figure 1B:
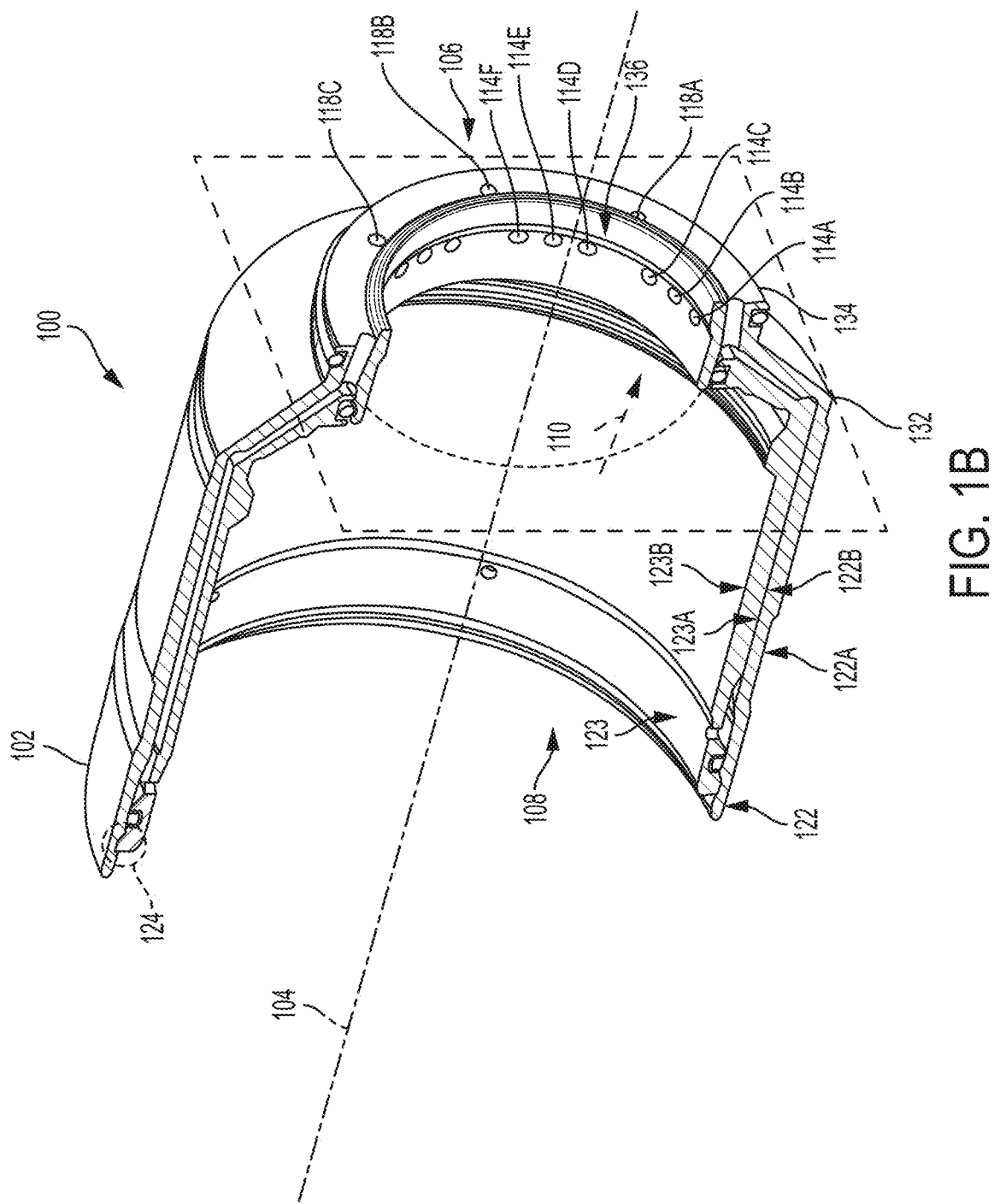
FIG. 1B is a half-sectional perspective view of the inner cap shown in FIG. 1A, according to an illustrative embodiment of the invention.

FIG. 1A is a perspective view of an inner cap 100 for a liquid-cooled plasma arc torch, according to an illustrative embodiment of the invention, and FIG. 1B is a half-sectional perspective view of the inner cap 100 shown in FIG. 1A. The inner cap 100 includes a substantially hollow body 102 having a longitudinal axis 104, a first end 106, and a second end 108. The first end 106 includes an annular portion 110 configured to be disposed proximate a torch tip of the plasma arc torch. The inner cap 100 includes a liquid passage 114 (e.g., having a first set of ports 114A-114F in the annular portion 110) that is formed within the body 102 and shaped to convey a liquid therethrough. The inner cap 100 also includes a gas passage 118 (e.g., having a second set of ports 118A-118C formed in the annular portion 110) that is formed within the body 102 and shaped to convey a gas therethrough. The gas passage is configured to transport a shield gas and the liquid passage is configured to transport a consumable coolant.

As shown in the embodiment of FIGS. 1A-1B, subsets of ports in the first set of ports 114A-114F direct the liquid in a radial direction with respect to the longitudinal axis 104 and alternate, in a rotational direction about the longitudinal axis 104, with subsets of ports in the second sets of ports 118A-118C that direct the gas in a direction substantially parallel with the longitudinal axis 104. For example, in FIGS. 1A-1B, subsets of ports alternate as follows in a radial direction about the longitudinal axis 104: 114A-114C; 118A; 114D-F; 118B; and so on, such that the alternation pattern is three liquid ports followed by one gas port. In this way, the first set of ports can be interleaved with the second set of ports to create alternating cross-flow regions of liquid and gas through the tip of the inner retaining cap during operation of the plasma torch. In such arrangements, the inner cap 100 can create a full radial "showerhead" effect, with liquid passing radially in multiple streams through the first set of ports, and gas passing perpendicularly or substantially perpendicularly through the second set of ports. This arrangement promotes, for example, more even cooling (e.g. uniform cooling around all 360 degrees) and gas flow.

Generally, subsets of ports can include one or more ports each. In some embodiments, subsets of ports alternate in a regular pattern, e.g., one gas port, followed by two liquid ports, followed by one gas port, followed by two liquid ports. In some embodiments, subsets of ports alternate in an irregular pattern, e.g., one liquid port, two gas ports, three liquid ports, two gas ports. In some embodiments, only one liquid port and/or one gas port is used. In some embodiments, the sets of ports are oriented perpendicular or substantially perpendicular to each other, e.g., each port in the first set of ports is perpendicular or substantially perpendicular to a corresponding port in the second set of ports. For example, the first set of ports can be oriented perpendicular to the longitudinal axis, and the second set of ports oriented parallel to the longitudinal axis. In some embodiments, the first set of holes includes between five and nine holes and the second set of holes includes between six and eighteen holes. In some embodiments, the axially oriented gas flow holes (e.g., including but not limited to 118A-C) have a total cross-sectional area of at least 0.0053 square inches. In some embodiments, the radially oriented coolant holes (e.g., including but not limited to 114A-F) have a total cross-sectional area of at least about 0.02 square inches, or optionally about 0.041 square inches. In other embodiments, the total cross-sectional area of the radially oriented coolant holes is as large as the other constraints on the plasma arc torch will permit. In some embodiments, holes are uniformly distributed around the circumference to provide even cooling to the shield.

In some embodiments, the inner cap 100 includes an outer portion (or outer component) 122 and an inner portion (or inner component) 123. The outer portion 122 has an exterior surface 122A and an interior surface 122B, and the inner portion 123 has an exterior surface 123A and an interior surface 123B. The outer portion 122 at least substantially encloses the inner portion 123. The outer portion 122 can be formed of plastic, and the inner portion 123 can be formed of a metal or metal alloy, such as brass. In some embodiments, the inner cap 100 includes a snap feature 124 configured to secure the outer portion 122 to the inner portion 123. In some embodiments, the snap feature 124 includes a ridge or a notch in the outer portion 122 and a corresponding protrusion in the inner portion 123, the protrusion fitting snugly into the ridge or notch to secure the inner portion 123 to the outer portion 122. In some embodiments, the inner cap 100 is electrically insulative. In some embodiments, the first end 106 includes a tapered portion 126 adjacent to the annular portion 110. In some embodiments, the tapered portion 126 and the annular portion 110 form a neck portion.

As shown in FIGS. 1A-1B, a first portion 132 of the gas channel is defined, at least in part, by a portion of the exterior surface 123A of the inner component 123 and a portion of the interior surface 122B of the outer component 122. In some embodiments, a second portion 134 of the gas channel is defined within the annular region 110 of the outer component 122. In some embodiments, at least one of the first and second sets of ports can include slots in the body 102. Slots can be desirable as they are easier to manufacture than holes, which can be more expensive to drill. Slots can also be desirable because they permit more coolant flow area than some alternative geometries, and in some embodiments create less of a pressure drop as a result of drag forces from the walls of the slots. In some embodiments, the inner cap 100 includes a third set of ports 130 (e.g., 130A, 130B, 130C) aligned with the first set of ports 114 to form a set of liquid passageways through the inner cap.

The second portion 134 can include a set of axial gas passageways configured to pass the gas to the shield of the plasma arc torch (shown and described below in FIG. 2). The second portion 134 can include a set (e.g., of six) of holes drilled in the axial direction. The axial holes can be "pass through" only, e.g., they do not have a swirl impact (as opposed to in past designs, in which they imparted some directionality to the fluid flow). Generally, there should be a sufficient number and/or cross-sectional area of axial holes so that the holes are not a choke point in the system. In addition, a ratio of flow area between the second set of holes and a set of metering holes (e.g., in the swirling insulator 212 shown and described below in FIG. 2) in the first end of the inner cap can be at least 2:1. In one exemplary configuration, the ratio is about 2.6:1. In some embodiments, the inner cap 100 includes a plenum region 136 formed at least partially within the body 102.

Figure 2:
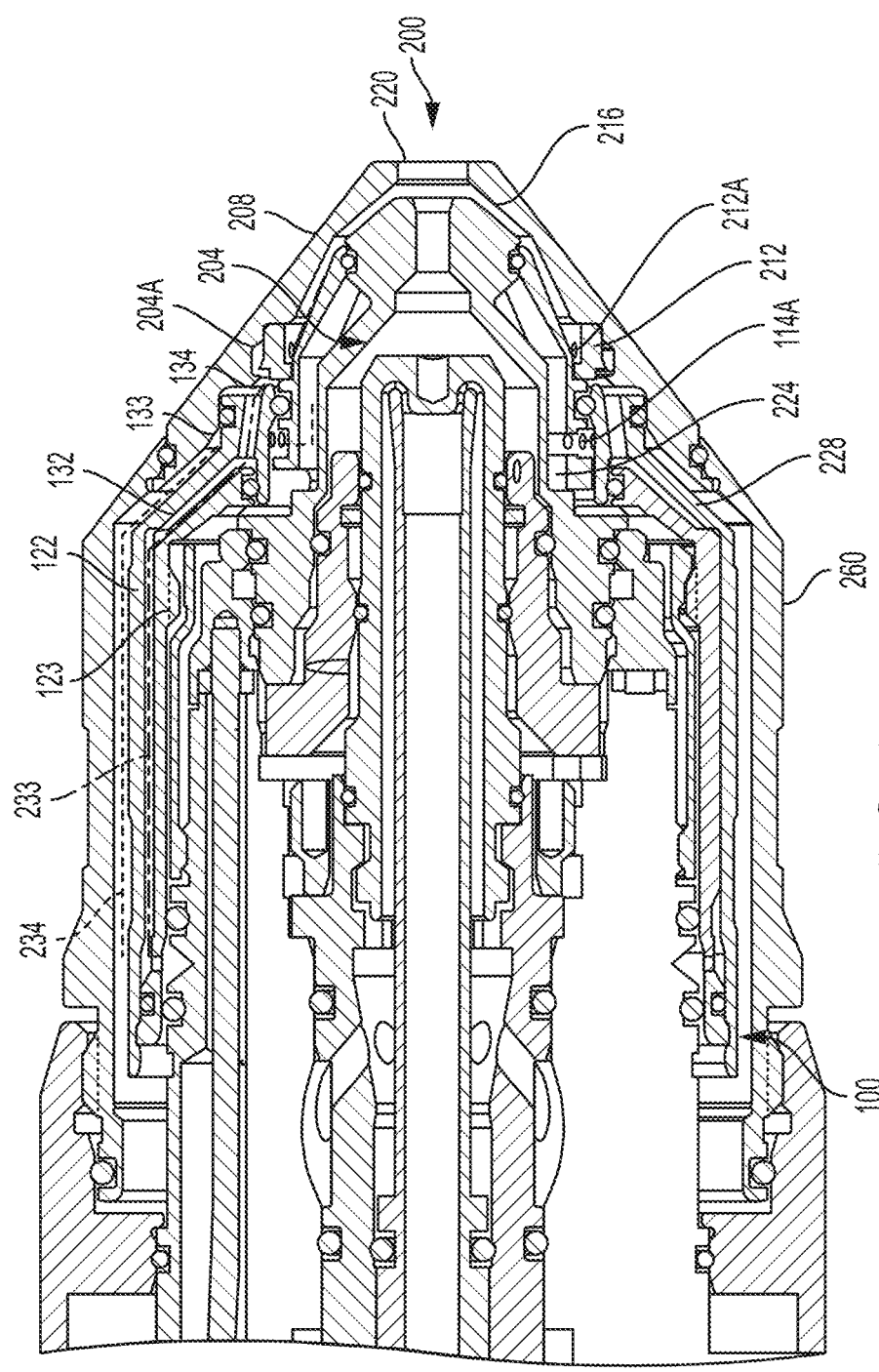
FIG. 2 is a cross-sectional view of an inner cap for a liquid-cooled plasma arc torch installed in a plasma arc torch, according to an illustrative embodiment of the invention.

FIG. 2 is a cross-sectional view of an inner cap 100 for a liquid-cooled plasma arc torch installed in a plasma arc torch 200, according to an illustrative embodiment of the invention. In this view, the features of the inner cap 100 shown and described above correspond to the numerals in FIGS. 1A-1B. When installed in the plasma arch torch 200, the inner cap 100 surrounds (e.g., at least partially surrounds) the nozzle 204. Shield gas flows through the passageway 132 along flow path 233 within the inner cap 100 and impinges on an interior surface 204A of the shield 208. Shield gas then continues through an orifice 212A in the swirling insulator 212 of the plasma arc torch 200. Shield gas then continues down passageway 216 and out the front orifice 220 of the plasma arc torch 200. Meanwhile, liquid coolant flows from the nozzle 204 through passageway 224 of the inner cap 100 along flow path 234. Liquid coolant then passes from the nozzle 204 side of the inner cap 100 to the shield 208 side of the inner cap 100 into passageway 228 (e.g., impinging on contact point 133), up back to the torch head. In this way, the total distance traveled by the liquid coolant is reduced over past designs, as the liquid coolant is able to pass directly from the nozzle to the shield, using the shortest path between these two consumables.

During operation of the torch, both liquid coolant and shield gas can flow simultaneously, creating a cross-flow of liquid and gas within the inner cap. The nozzle 204 and the shield 208 can be isolated electrically so as to minimize the risk of short-circuiting, e.g., via the coolant. In some embodiments, a channel (not shown) is formed in the body 102 and configured to transport fluid between an interior surface of the plenum region 136 and an exterior surface of a nozzle 204 of the plasma arc torch during operation of the plasma arc torch. In some embodiments, the channel extends circumferentially about the plenum region 136. In some embodiments, the shield cap 260 is manufactured as a single piece, as the shield cap 260 directs coolant only in one direction.

While the invention has been particularly shown and described with reference to specific preferred embodiments, it should be understood by those skilled in the art that various changes in from and detail may be made therein without departing from the spirit and scope of the invention as defined by the following claims.

What is claimed is:

1. A liquid cooled shield assembly for a plasma arc torch, the liquid cooled shield assembly comprising:
   an inner cap including:
      a substantially hollow body having a proximal end and a distal end that define a longitudinal axis, the distal end including an annular portion about the longitudinal axis; and
      a liquid passage defined, at least in part, by an interior surface of the body, the liquid passage including a first set of ports in the annular portion including three or more discreet, circumferentially disposed radial liquid exit ports, the first set of ports extending between an interior portion of the body and an exterior portion of the body to convey a cooling liquid out of the liquid exit ports in a radial direction with respect to the longitudinal axis; and a shield at least partially surrounding the inner cap and having a liquid impingement region on an interior surface of the shield adjacent to the first set of liquid exit ports, the liquid impingement region for (i) receiving the cooling liquid from the first set of liquid exit ports, and (ii) forming part of a liquid exit channel in the plasma arc torch.

2. The liquid cooled shield assembly of claim 1 wherein the first set of ports is interleaved with a second set of ports formed in a gas passage formed within the body to create a cross-flow of liquid and gas in the annular portion during operation of the plasma torch.

3. The liquid cooled shield assembly of claim 2 wherein each port in the first set of ports is perpendicular or substantially perpendicular to a corresponding port in the second set of ports.

4. The liquid cooled shield assembly of claim 2 wherein the first set of ports is oriented perpendicular to the longitudinal axis and the second set of ports is oriented parallel to the longitudinal axis.

5. The liquid cooled shield assembly of claim 1 further including a plenum region formed at least partially within the body.

6. The liquid cooled shield assembly of claim 5 further including a channel formed in the body and configured to transport fluid between an interior surface of the plenum region and an exterior surface of a nozzle of the plasma arc torch during operation of the plasma arc torch.

7. The liquid cooled shield assembly of claim 6 wherein the channel extends circumferentially about the plenum region.

8. The liquid cooled shield assembly of claim 1 wherein the inner cap is electrically insulative.

9. The liquid cooled shield assembly of claim 2 wherein at least one of the first and second sets of ports includes slots in the body.

10. The liquid cooled shield assembly of claim 2 wherein the gas passage is configured to transport a shield gas and the liquid passage is configured to transport a consumable coolant.

11. The liquid cooled shield assembly of claim 2 further including a third set of ports aligned with the first set of ports to form a set of liquid passageways through the inner cap.

12. The liquid cooled shield assembly of claim 1 wherein the proximal end includes a tapered portion adjacent to the annular portion.

13. The liquid cooled shield assembly of claim 1 wherein the proximal end includes a neck portion.

14. The liquid cooled shield assembly of claim 2 wherein the gas passage includes a first set of pathways fluidly connected to an interior region of the inner cap and the liquid passage includes a second set of pathways fluidly connected to interior and exterior regions of the inner cap.

15. The liquid cooled shield assembly of claim 1 wherein the inner cap includes an outer portion and an inner portion, the outer portion at least substantially enclosing the inner portion.

16. The liquid cooled shield assembly of claim 15 further comprising a snap feature configured to secure the outer portion to the inner portion.

17. The liquid cooled shield assembly of claim 15 wherein the outer portion is formed of plastic and the inner portion is formed of a metal or metal alloy.

18. The liquid cooled shield assembly of claim 2 wherein the first set of ports includes between five and nine ports and the second set of ports includes between six and eighteen ports.

19. The liquid cooled shield assembly of claim 1 wherein a ratio of flow area between the second set of ports and a set of metering holes in the first end of the inner cap is at least 2:1.

20. The liquid cooled shield assembly of claim 1 wherein the inner cap is symmetrical in the rotational direction.

21. The liquid cooled shield assembly of claim 1 wherein the cooling liquid passes from a nozzle side of the inner cap to a shield side of the inner cap.

22. The liquid cooled shield assembly of claim 1 wherein the liquid passage is configured to pass the cooling liquid directly from the nozzle to the shield.

* * * * *